US008555987B2

(12) United States Patent
Kriesels et al.

(10) Patent No.: US 8,555,987 B2
(45) Date of Patent: Oct. 15, 2013

(54) METHOD OF CREATING A WELLBORE SYSTEM

(75) Inventors: Petrus Cornelis Kriesels, Rijswijk (NL); Pieter Van Nieuwkoop, Rijswijk (NL)

(73) Assignee: Shell Oil Company, Houston, TX (US)

(*) Notice: Subject to any disclaimer, the term of this patent is extended or adjusted under 35 U.S.C. 154(b) by 635 days.

(21) Appl. No.: 12/747,047

(22) PCT Filed: Dec. 11, 2008

(86) PCT No.: PCT/EP2008/067307
§ 371 (c)(1),
(2), (4) Date: Jun. 9, 2010

(87) PCT Pub. No.: WO2009/074643
PCT Pub. Date: Jun. 18, 2009

(65) Prior Publication Data
US 2010/0270037 A1    Oct. 28, 2010

(30) Foreign Application Priority Data
Dec. 13, 2007  (EP) .................................... 07123101

(51) Int. Cl.
*E21B 19/00*    (2006.01)
(52) U.S. Cl.
USPC ............................ 166/384; 166/207; 405/146
(58) Field of Classification Search
USPC ........ 166/384, 207; 405/146; 175/57; 138/98
See application file for complete search history.

(56) References Cited

U.S. PATENT DOCUMENTS

| 2,927,775 | A | 3/1960 | Hildebrandt | 255/72 |
| 3,674,100 | A | 7/1972 | Becker | 175/69 |
| 5,501,248 | A * | 3/1996 | Kiest, Jr. | 138/98 |
| 5,549,856 | A * | 8/1996 | Yokoshima | 264/36.17 |
| 5,803,666 | A | 9/1998 | Keller | 405/146 |
| 7,051,766 | B2 * | 5/2006 | Kamiyama et al. | 138/98 |
| 2004/0020544 | A1 * | 2/2004 | Kamiyama et al. | 138/98 |
| 2004/0045617 | A1 | 3/2004 | Kamiyama et al. | 138/98 |
| 2007/0017669 | A1 * | 1/2007 | Lurie | 166/177.4 |
| 2007/0107941 | A1 | 5/2007 | Fillipov et al. | 175/57 |

FOREIGN PATENT DOCUMENTS

| EP | 0044706 | 1/1982 |
| EP | 0919762 | 6/1999 |
| WO | WO9516556 | 6/1995 |
| WO | WO03036025 | 5/2003 |

* cited by examiner

Primary Examiner — Jennifer H Gay
Assistant Examiner — Kipp Wallace

(57) ABSTRACT

A method of creating a wellbore system comprises arranging an expandable tubular element in a wellbore whereby a lower end portion of the wall of the tubular element extends radially outward and in an axially reverse direction so as to form an expanded section extending around a remaining tubular section of the tubular element, and axially extending the expanded section by moving the remaining tubular section downward relative to the expanded section so that said lower end portion of the wall bends radially outward and in an axially reverse direction, whereby an annulus is defined between said expanded and remaining tubular sections, the annulus containing a body of fluid. A volume of the fluid is replaced by pumping a replacement fluid into the annulus and discharging the volume of fluid from the annulus whereby at least one of the volume of fluid and the replacement fluid flows into the annulus.

19 Claims, 4 Drawing Sheets

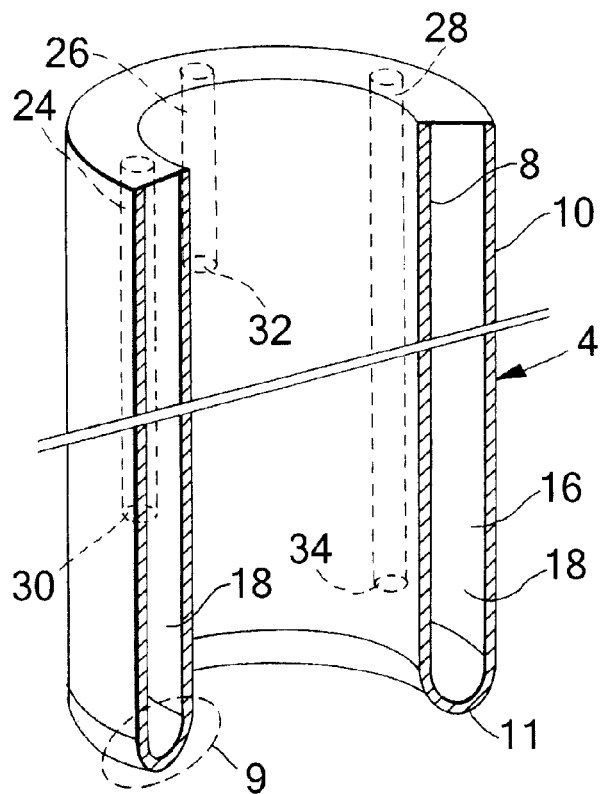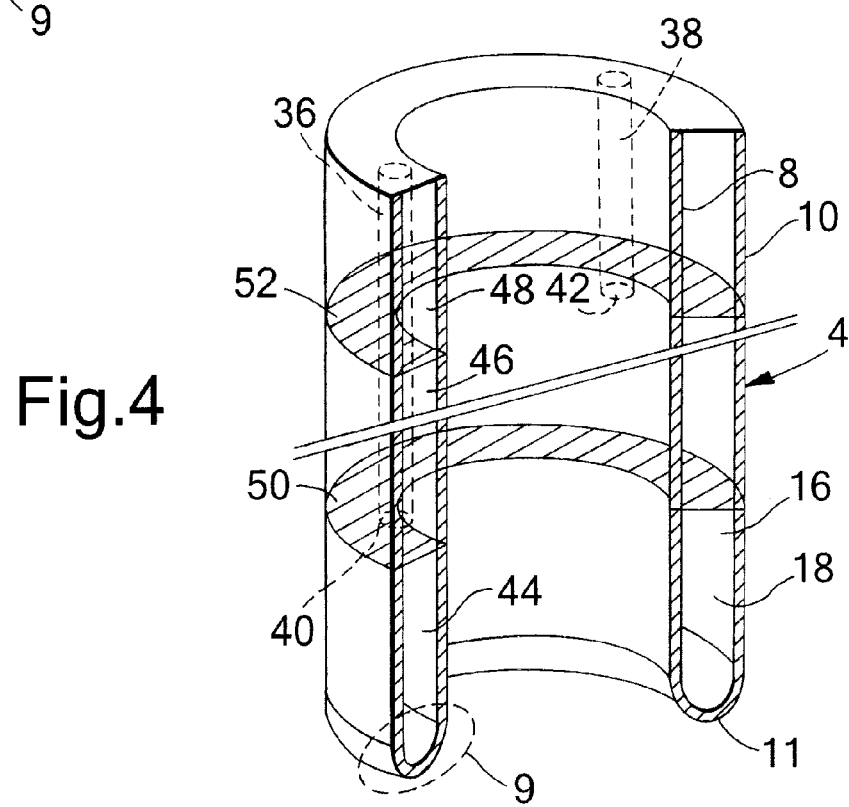

METHOD OF CREATING A WELLBORE SYSTEM

PRIORITY CLAIM

The present application claims priority to PCT Application EP2008/067307, filed 11 Dec. 2008, which claims priority to European Patent Application No. EP 07123101.3, filed 13 Dec. 2007.

TECHNICAL FIELD OF THE INVENTION

The present invention relates to a method of creating a wellbore system whereby an expanded tubular element is employed in a wellbore.

BACKGROUND OF THE INVENTION

The technology of radially expanding tubular elements in wellbores finds increasing application in the industry of oil and gas production from subterranean formations. Wellbores are generally provided with one or more casings or liners to provide stability to the wellbore wall, and/or to provide zonal isolation between different earth formation layers. The terms "casing" and "liner" refer to tubular elements for supporting and stabilising the wellbore wall, whereby it is generally understood that casing extends from surface into the wellbore and that a liner extends from a certain depth further into the wellbore. However, in the context of this disclosure the terms "casing" and "liner" are used interchangeably and without such intended distinction.

In conventional wellbore construction, several casings are installed at different depth intervals, in a nested arrangement, whereby each subsequent casing is lowered through the previous casing and therefore has a smaller diameter than the previous casing. As a result, the cross-sectional wellbore size that is available for oil and gas production, decreases with depth. To alleviate this drawback, it has become general practice to radially expand one or more tubular elements at the desired depth in the wellbore, for example to form an expanded casing, expanded liner, or a clad against an existing casing or liner. Also, it has been proposed to radially expand each subsequent casing to substantially the same diameter as the previous casing to form a monobore wellbore. It is thus achieved that the available diameter of the wellbore remains substantially constant along (a portion of) its depth as opposed to the conventional nested arrangement.

EP 1438483 B1 discloses a system for expanding a tubular element in a wellbore whereby the tubular element, in unexpanded state, is initially attached to a drill string during drilling of a new wellbore section.

To expand such wellbore tubular element, generally a conical expander is used with a largest outer diameter substantially equal to the required tubular diameter after expansion. The expander is pumped, pushed or pulled through the tubular element. Such method can lead to high friction forces between the expander and the tubular element. Also, there is a risk that the expander becomes stuck in the tubular element.

EP 0044706 A2 discloses a flexible tube of woven material or cloth that is expanded in a wellbore by eversion to separate drilling fluid pumped into the wellbore from slurry cuttings flowing towards the surface.

However there is a need for an improved method of creating a wellbore system whereby an expanded tubular element is employed.

SUMMARY OF THE INVENTION

In accordance with the invention there is provided a method of creating a wellbore system, the method comprising:

a) arranging an expandable tubular element in a wellbore formed in an earth formation whereby a lower end portion of the wall of the tubular element extends radially outward and in axially reverse direction so as to form an expanded tubular section extending around a remaining tubular section of the tubular element;

b) axially extending the expanded tubular section by moving the remaining tubular section downward relative to the expanded tubular section so that said lower end portion of the wall bends radially outward and in axially reverse direction, whereby an annulus is defined between said expanded and remaining tubular sections, the annulus containing a body of fluid;

c) replacing a volume of said fluid by pumping a stream of replacement fluid into the annulus and discharging said volume of fluid from the annulus whereby at least one of said volume of fluid and said stream of replacement fluid flows through a conduit extending into the annulus.

By moving the remaining tubular section downward relative to the expanded tubular section, the tubular element is effectively turned inside out whereby the tubular element is progressively expanded without the need for an expander that is pushed, pulled or pumped through the tubular element. The expanded tubular section can form a casing or liner in the wellbore.

Furthermore, by replacing a portion, or all, of the fluid in the annulus, the fluid pressure in the annulus can be adapted to the wellbore fluid pressure, for example to minimise a pressure difference across the wall of the tubular element in the bending zone. The conduit enables fluid to be circulated into, and out of, the annulus.

Suitably said replacement stream of fluid is pumped into the annulus via the conduit. Furthermore it is preferred that the conduit is a first conduit, and said volume of fluid is discharged through a second conduit extending into the annulus.

To allow fluid streams of different densities to be inserted into the annulus, suitable the first conduit has a fluid outlet in the annulus and the second conduit has a fluid inlet in the annulus, said fluid outlet and fluid inlet being arranged at mutually different vertical levels. For example, if the fluid outlet is arranged at a higher vertical level than said fluid inlet, a layer of fluid can be pumped into the annulus between said inlet and outlet without affecting fluid present in the annulus below the outlet.

To reduce the risk of wellbore fluid leaking into the annulus in case of damage to the wall in the bending zone, whereby the expanded tubular section has an outer surface subjected to an outer fluid pressure and an inner surface subjected to an inner fluid pressure, it is preferred that the stream of fluid is controlled such that, at said lower end portion of the wall, the inner fluid pressure is at least equal to the outer fluid pressure. More preferably the inner fluid pressure exceeds the outer fluid pressure at said lower end portion of the wall. The outer fluid pressure is, for example, exerted to the outer surface by at least one of a drilling fluid present in the wellbore and a pore fluid present in the earth formation.

In some applications, such as during drilling of the wellbore, the outer fluid pressure varies along a length of the expanded tubular section. It is then preferred that the stream of fluid is controlled so that, at each level along said length, the inner fluid pressure is substantially equal to, or exceeds, the outer fluid pressure.

Suitably the step of controlling the stream of fluid comprises controlling the density of the stream of fluid.

In order to achieve that the expanded tubular section retains its expanded form, it is preferred that the wall of the tubular element includes a material that is plastically deformed in the bending zone, so that the expanded tubular section automatically remains expanded as a result of said plastic deformation. Plastic deformation refers in this respect to permanent deformation, as occurring during deformation of various ductile metals upon exceeding the yield strength of the material. Thus, there is no need for an external force or pressure to maintain the expanded form. If, for example, the expanded tubular section has been expanded against the wellbore wall as a result of said bending of the wall, no external radial force or pressure needs to be exerted to the expanded tubular section to keep it against the wellbore wall. Suitably the wall of the tubular element is made of a metal such as steel or any other ductile metal capable of being plastically deformed by eversion of the tubular element. The expanded tubular section then has adequate collapse resistance, for example in the order of 100-150 bars.

In order to induce said movement of the remaining tubular section, preferably the remaining tubular section is subjected to an axially compressive force acting to induce said movement. The axially compressive force preferably at least partly results from the weight of the remaining tubular section. If necessary the weight can be supplemented by an external, downward, force applied to the remaining tubular section to induce said movement. As the length, and hence the weight, of the remaining tubular section increases, an upward force may need to be applied to the remaining tubular section to prevent uncontrolled bending or buckling in the bending zone.

BRIEF DESCRIPTION OF THE DRAWING

The invention will be described hereinafter in more detail and by way of example, with reference to the accompanying drawings in which:

FIG. 3 schematically shows, in perspective view, and partly broken away for clarity, an everted liner of a second embodiment of a wellbore system used with the method of the invention;

FIG. 4 schematically shows, in perspective view, and partly broken away for clarity, an everted liner of a third embodiment of a wellbore system used with the method of the invention.

In the drawings and the description, like reference numerals relate to like components.

DETAILED DESCRIPTION OF THE PREFERRED EMBODIMENTS

Figure 1:
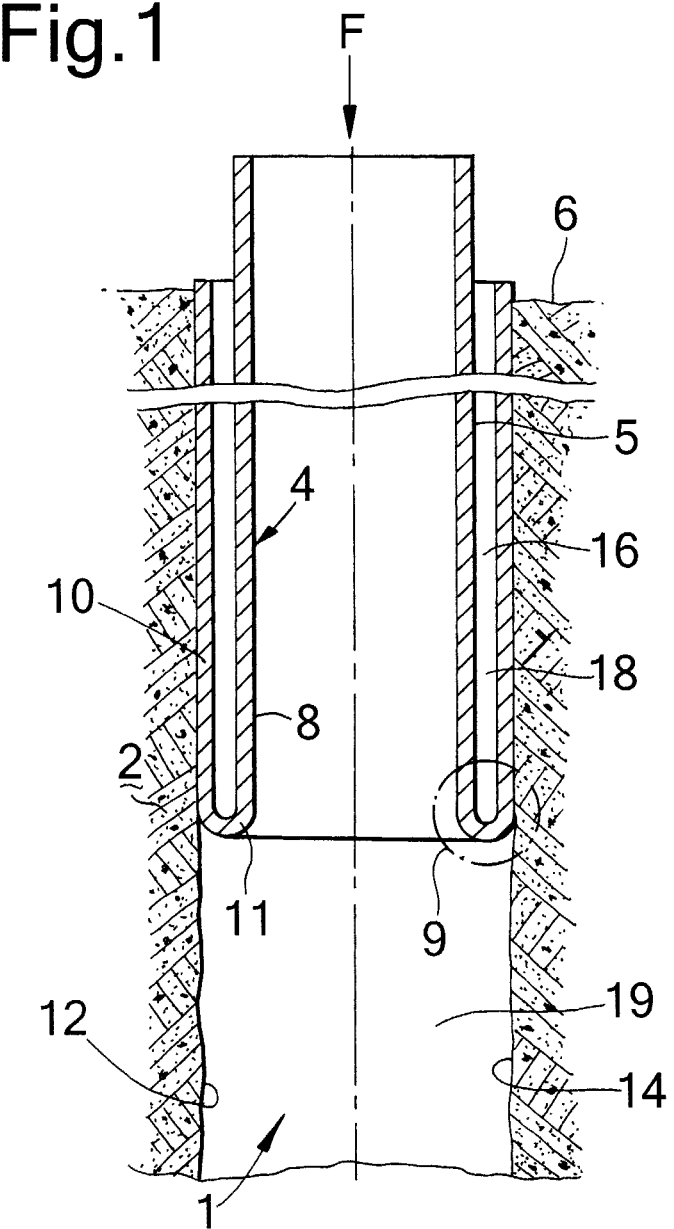
FIG. 1 schematically shows, in longitudinal section, a first embodiment of a wellbore system used with the method of the invention.

Referring to FIG. 1 there is shown a first embodiment of a wellbore system used with the method of the invention, whereby a wellbore 1 extends into an earth formation 2, and whereby a tubular element in the form of liner 4 extends from surface 6 downwardly into the wellbore 1. The liner 4 has been partially radially expanded by eversion of its wall 5 whereby a radially expanded tubular section 10 of the liner 4 has been formed of outer diameter substantially equal to the wellbore diameter. A remaining tubular section of the liner 4, in the form of unexpanded liner section 8, extends from surface 6 concentrically into the expanded tubular section 10.

The wall 5 of the liner 4 is, due to eversion at its lower end, bent radially outward and in axially reverse (i.e. upward) direction so as to form a U-shaped lower section 11 of the wall 5 interconnecting the unexpanded liner section 8 and the expanded liner section 10. The U-shaped lower section 11 of the liner 4 defines a bending zone 9 of the liner. The expanded tubular section 10 and the remaining tubular section 8 define an annulus 16 there between, containing a body of fluid 18 exerting an inner fluid pressure to the expanded tubular section 10, to the U-shaped lower section 11 an to the unexpanded liner section 8.

The expanded liner section 10 is axially fixed to the wellbore wall 14 by virtue of frictional forces between the expanded liner section 10 and the wellbore wall 14 resulting from the expansion process. Alternatively, or additionally, the expanded liner section 10 can be anchored to the wellbore wall by any suitable anchoring means (not shown).

The wellbore 1 has an open-hole lower portion 19 located below the liner 4, whereby the unexpanded liner section 8 and the open-hole portion 19 contain a volume of wellbore fluid, for example drilling fluid used to drill the wellbore 1 or pore fluid from the surrounding earth formation 2.

Figure 2:
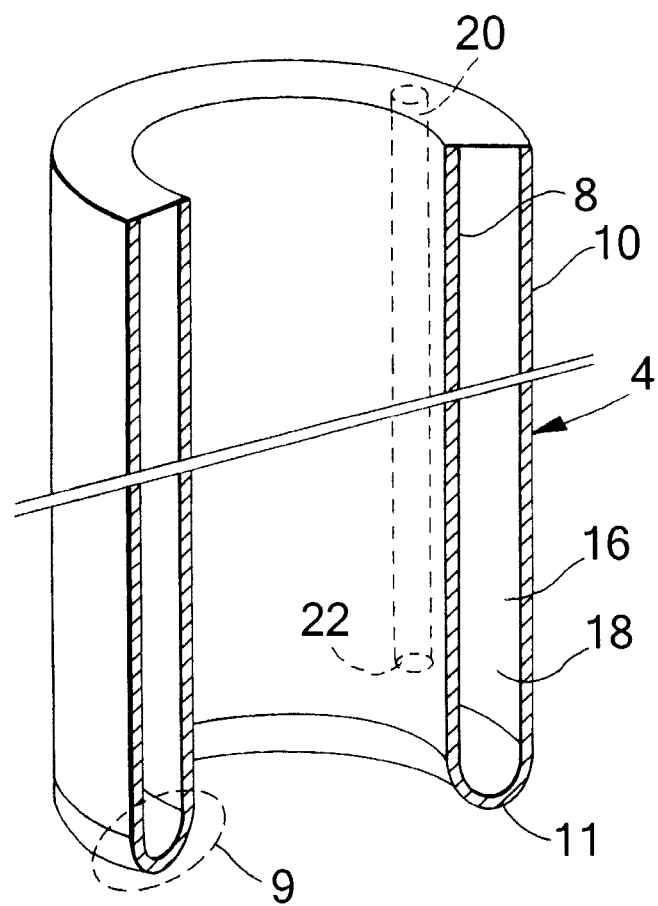
FIG. 2 schematically shows, in perspective view, and partly broken away for clarity, an everted liner of the first embodiment.

Referring to FIG. 2 there is shown the unexpanded and expanded liner sections 8, 10 of the first embodiment, with a tube 20 extending from surface 6 into the annulus 16. The tube 20 has an open lower end 22 positioned in a lower portion of the annulus 16.

Referring to FIG. 3 there is shown the unexpanded and expanded liner sections 8, 10 of a second embodiment of the wellbore system used with the method of the invention. The second embodiment is substantially similar to the first embodiment, except that a plurality of tubes 24, 26, 28 extend from surface 6 into the annulus 16. The tubes 24, 26, 28 have respective open lower ends 30, 32, 34 whereby open end 34 is positioned below open end 30 which, in turn, is positioned below open end 32.

Referring to FIG. 4 there is shown the unexpanded and expanded liner sections 8, 10 of a third embodiment of the wellbore system used with the method of the invention. The third embodiment is substantially similar to the first embodiment, except that a pair of tubes 36, 38 extend from surface 6 into the annulus 16. The tubes 36, 38 have respective open lower ends 40, 42 positioned at mutually different vertical levels in the annulus 16. Furthermore, the annulus 16 is divided into a lower compartment 44, a middle compartment 46 and an upper compartment 48. The open end 40 of tube 36 is located in lower compartment 44, and the open end 42 of tube 38 is located in middle compartment 46. The compartments 44, 46, 48 are sealed from each other by respective annular seals 50, 52 positioned in the annulus 16.

Figure 5:
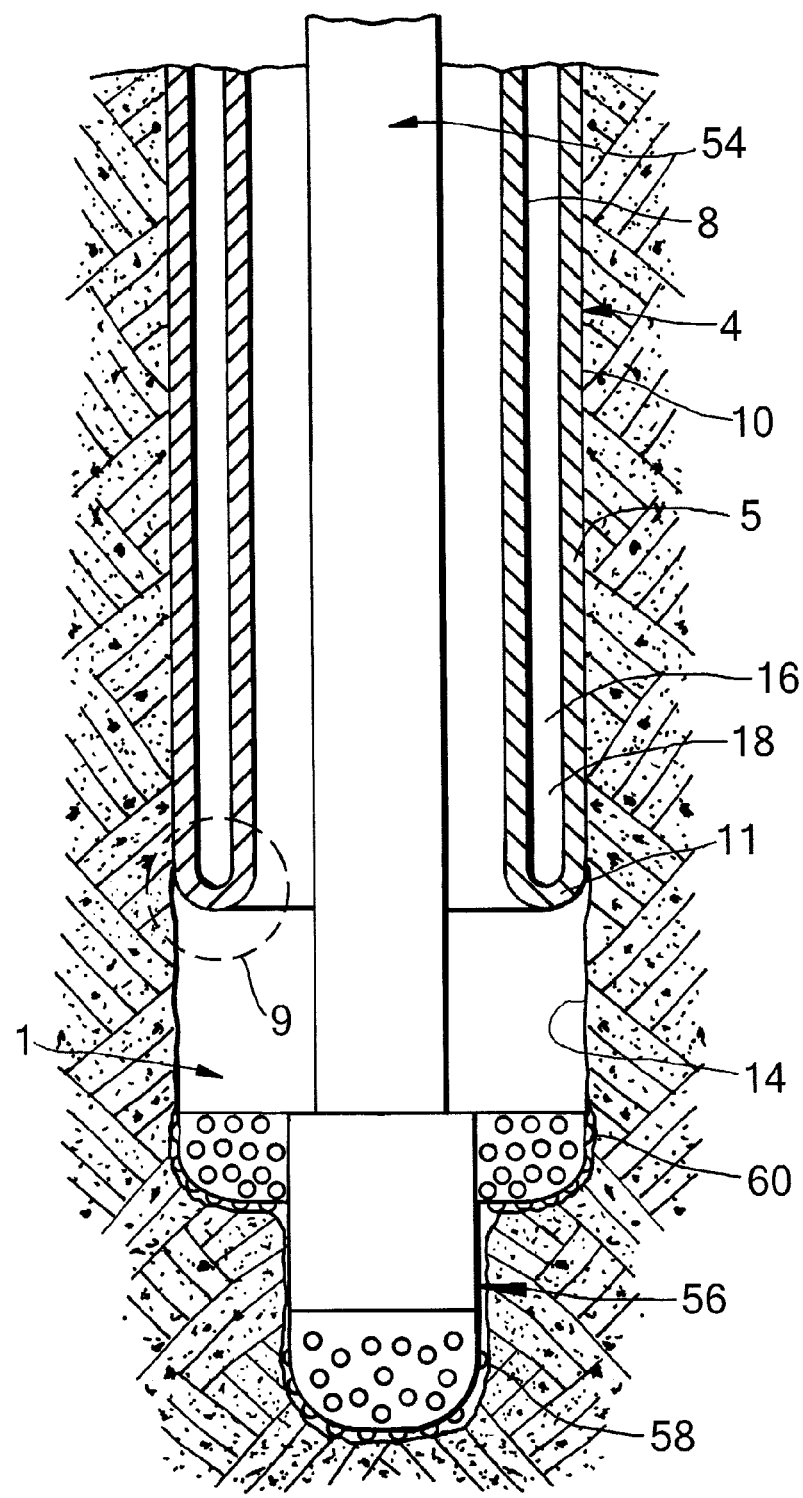
FIG. 5 schematically shows the first embodiment modified in that a drill string is operated to further drill the wellbore.

Referring to FIG. 5 there is shown the first embodiment during drilling of the wellbore 1 whereby a drill string 54 extends from surface 6 through the unexpanded liner section 8 to the bottom of the wellbore 1. The drill string 54 is at its lower end provided with a drill bit 56 comprising a pilot bit 58 with gauge diameter slightly smaller than the internal diameter of the unexpanded liner section 8, and a reamer section 60 with gauge diameter adapted to drill the wellbore 1 to its nominal diameter. The reamer section 60 is radially retractable to an outer diameter allowing it to pass through unexpanded liner section 8, so that the drill string 54 can be retrieved through the unexpanded liner section 8 to surface.

During normal operation of the first embodiment (FIGS. 1 and 2), a lower end portion of the liner 4 is initially everted. That is, the lower portion is bent radially outward and in axially reverse direction. The U-shaped lower section 11 and the expanded liner section 10 are thereby initiated. Subsequently, the short length of expanded liner section 10 that has been formed is anchored to the wellbore wall 14 by any suitable anchoring means. Depending on the geometry and/or material properties of the liner 4, the expanded liner section 10 alternatively can become anchored to the wellbore wall automatically due to friction between the expanded liner section 10 and the wellbore wall 14.

The unexpanded liner section 8 is then gradually moved downward by application of a sufficiently large downward force F thereto, whereby the unexpanded liner section 8 becomes progressively everted in the bending zone 9. In this manner the unexpanded liner section 8 is progressively transformed into the expanded liner section 10. The bending zone 9 moves in downward direction during the eversion process, at approximately half the speed of the unexpanded liner section 8.

Since the length, and hence the weight, of the unexpanded liner section 8 gradually increases, the magnitude of the downward force F can be gradually lowered in correspondence with the increasing weight of liner section 8. As the weight increases, the downward force eventually may need to be replaced by an upward force to prevent buckling of liner section 8.

Simultaneously with downward movement of unexpanded liner section 8, or at selected time intervals, a stream of fluid is pumped via the tube 20 into the annulus 16. The fluid density of the fluid stream is selected such that, at the depth-level of the bending zone 9, the fluid pressure in the annulus 16 is equal to, or exceeds, the fluid pressure in the open-hole portion 19 of the wellbore 1. This can be achieved, for example, by selecting the fluid density of the stream of fluid to be equal to, or larger than, the fluid density of the wellbore fluid present in the unexpanded liner section 8 and the open-hole portion 19. If the fluid density of the wellbore fluid varies with depth, the fluid density of the pumped stream of fluid is varied correspondingly. In this manner it is achieved that, in case a leak occurs in the wall 5 during bending in the bending zone, wellbore fluid cannot not escape from the open-hole portion 19 via such leak into the annulus 16. Pressure control in the wellbore 1 is thereby maintained.

Normal operation of the second embodiment (FIG. 3) is substantially similar to normal operation of the first embodiment, except with regard to the following. Separate stream streams of fluid are pumped via the tubes 24, 26, 28 into the annulus 16, with the fluid density of the stream in conduit 34 being higher than the fluid density of the stream in conduit 30 being higher than the fluid density of the stream in conduit 32. The body of fluid 18 in the annulus 16 is thereby formed of fluid layers of different densities separated from each other by gravity. The densities are selected such that at the depth-level of the bending zone 9, the fluid pressure in the annulus 16 is equal to, or exceeds, the fluid pressure in the open-hole portion 19 of the wellbore 1.

Normal operation of the third embodiment (FIG. 4) is substantially similar to normal operation of the second embodiment, except with regard to the following. Separate stream streams of fluid are pumped via the tubes 36, 38 into the respective compartments 44, 46, whereby the fluid density of the stream in conduit 36 is lower than the fluid density of the stream in conduit 38. The body of fluid 18 in the annulus 16 is thereby formed of fluid layers of different densities, whereby the fluid densities are selected such that at the depth-level of bending zone 9, the fluid pressure in the annulus 16 is equal to, or exceeds, the fluid pressure in the open-hole portion 19 of the wellbore 1. The annular seals 50, 52 prevent intermixing of the fluids in the different compartments.

Normal operation of the modified first embodiment (FIG. 5) is substantially similar to normal operation of the first embodiment, except with regard to the following. Simultaneously with downward movement of the unexpanded liner section 8 into the wellbore, the drill string 54 is operated to rotate the drill bit 56 whereby the pilot bit 58 drills an initial portion of the borehole and the reamer section 60 enlarges the borehole to the final gauge diameter. The drill string 54 thereby gradually moves downward into the wellbore 1. The unexpanded liner section 8 is moved downward in a controlled manner and at substantially the same speed as the drill string 54, so that it is ensured that the bending zone 9 remains at a short distance above the drill bit 56. Controlled lowering of the unexpanded liner section 8 can be achieved, for example, by controlling the downward force, or upward force, referred to hereinbefore. Suitably, the unexpanded liner section 8 is supported by the drill string 56, for example by bearing means (not shown) connected to the drill string, which supports the U-shaped lower section 11. In that case the upward force suitably is applied to the drill string and transmitted via the bearing means to the unexpanded liner section 8. Furthermore, at least a portion of the weight of the unexpanded liner section 8 can be transferred to the drill string 54 by the bearing means, so as to provide a thrust force to the drill bit 56.

During the drilling process, drilling fluid is circulated into the wellbore in conventional manner whereby the drilling fluid density is generally increased with increasing depth. As a result the drilling fluid pressure exerted to the wall of the tubular element in the bending zone increases correspondingly. With the method of the invention, the fluid density of the stream of replacement fluid is suitably selected such that the fluid pressure in the annulus 16 at the level of the bending zone 9 is equal to, or slightly exceeds, the drilling fluid pressure at that level.

When it is required to retrieve the drill string 54 to surface, for example when the drill bit 56 is to be replaced or when drilling of the wellbore 1 is complete, the reamer section 60 brought to its radially retracted mode. Subsequently the drill string 54 is retrieved through the unexpanded liner section 8 to surface.

With the wellbore system of the invention, it is achieved that the wellbore is progressively lined with the everted liner directly above the drill bit during the drilling process. As a result, there is only a relatively short open-hole section of the wellbore during the drilling process at all times. The advantages of such short open-hole section will be most pronounced during drilling into a hydrocarbon fluid containing layer of the earth formation. In view thereof, for many applications it will be sufficient if the process of liner eversion during drilling is applied only during drilling into the hydrocarbon fluid reservoir, while other sections of the wellbore are lined or cased in conventional manner. Alternatively, the process of liner eversion during drilling may be commenced at surface or at a selected downhole location, depending on circumstances.

In view of the short open-hole section during drilling, there is a significantly reduced risk that the wellbore fluid pressure gradient exceeds the fracture gradient of the rock formation, or that the wellbore fluid pressure gradient drops below the pore pressure gradient of the rock formation. Therefore, considerably longer intervals can be drilled at a single nominal diameter than in a conventional drilling practice whereby casings of stepwise decreasing diameter must be set at selected intervals.

Also, if the wellbore is drilled through a shale layer, such short open-hole section eliminates possible problems due to a heaving tendency of the shale.

In the above examples, expansion of the liner is started at surface or at a downhole location. In case of an offshore wellbore whereby an offshore platform is positioned above the wellbore, at the water surface, it can be advantageous to start the expansion process at the offshore platform. In such process, the bending zone moves from the offshore platform to the seabed and from there further into the wellbore. Thus, the resulting expanded tubular element not only forms a liner in the wellbore, but also a riser extending from the offshore platform to the seabed. The need for a separate riser is thereby obviated.

Furthermore, conduits such as electric wires or optical fibres for communication with downhole equipment can be extended in the annulus between the expanded and unexpanded sections. Such conduits can be attached to the outer surface of the tubular element before expansion thereof. Also, the expanded and unexpanded liner sections can be used as electricity conductors to transfer data and/or power downhole.

Since any length of unexpanded liner section that is still present in the wellbore after completion of the eversion process, will be subjected to less stringent loading conditions than the expanded liner section, such length of unexpanded liner section may have a smaller wall thickness, or may be of lower quality or steel grade, than the expanded liner section. For example, it may be made of pipe having a relatively low yield strength or relatively low collapse rating.

In order to reduce friction forces between the unexpanded and expanded liner sections during the expansion process, suitably a friction-reducing layer, such as a Teflon layer, is applied between the tube and the unexpanded and expanded liner sections. For example, a friction reducing coating can be applied to the outer surface of the liner before expansion, or to the inner and/or outer surface of the tube.

Instead of expanding the expanded liner section against the wellbore wall (as explained in the detailed description), the expanded liner section can be expanded against the inner surface of another tubular element already present in the wellbore.

The method of the invention also can be used to pump a high temperature fluid, or one or more compounds performing an exothermic reaction, into the annulus so as to heat the wall of the tubular element in the bending zone to improve its bending capability.

The invention claimed is:

1. A method of creating a wellbore system, the method comprising:
   a) arranging an expandable tubular element in a wellbore formed in an earth formation whereby the tubular element extends from the surface downwardly into the wellbore and a lower end portion of a wall of the tubular element extends radially outward and in an axially reverse direction so as to form an expanded tubular section extending around a remaining tubular section of the expandable tubular element;
   b) axially extending the expanded tubular section by applying a downward force to the remaining tubular section at the surface thereby moving the remaining tubular section downward relative to the expanded tubular section so that the lower end portion of the wall bends radially outward and in an axially reverse direction, whereby an annulus is defined between the expanded and remaining tubular sections, the annulus containing a fluid;
   c) replacing a volume of the fluid by pumping a stream of a replacement fluid into the annulus and discharging the volume of the fluid from the annulus whereby at least one of the volume of the fluid and the stream of the replacement fluid flows through a conduit extending into the annulus, wherein the replacement fluid and the fluid have mutually different densities; and
   d) arranging sealing means in the annulus so as to seal the replacement fluid from the fluid.

2. The method of claim 1, wherein the stream of the replacement fluid is pumped into the annulus via the conduit.

3. The method of claim 2, wherein the conduit is a first conduit, and wherein the volume of fluid is discharged through a second conduit extending into the annulus.

4. The method of claim 3, wherein the first conduit has a fluid outlet in the annulus and the second conduit has a fluid inlet in the annulus, the fluid outlet and the fluid inlet being arranged at mutually different vertical levels.

5. The method of claim 4, wherein the fluid outlet is arranged at a higher vertical level than the fluid inlet.

6. The method of claim 1, wherein the expanded tubular section has an outer surface subjected to an outer fluid pressure and an inner surface subjected to an inner fluid pressure, and wherein the method further comprises controlling the stream of the replacement fluid so that, at the lower end portion of the wall, the inner fluid pressure is at least equal to the outer fluid pressure.

7. The method of claim 6, wherein, at the lower end portion of the wall, the inner fluid pressure exceeds the outer fluid pressure.

8. The method of claim 6, wherein the outer fluid pressure is exerted to the outer surface by at least one of a drilling fluid present in the wellbore and a pore fluid present in the earth formation.

9. The method of claim 8, wherein the outer fluid pressure varies along a length of the expanded tubular section, and wherein the method further comprises controlling the stream of the replacement fluid so that, at each level along said length, the inner fluid pressure is substantially equal to the outer fluid pressure.

10. The method of claim 9, wherein the step of controlling the stream of the replacement fluid comprises controlling the density of the replacement fluid.

11. The method of claim 1, wherein a drill string is operated to further drill the wellbore, the drill string extending through the remaining tubular section.

12. The method of claim 11, wherein the drill string is operated simultaneously with moving the remaining tubular section downward in the wellbore.

13. The method of claim 1, wherein the wall of the tubular element includes a material subject to plastic deformation during the bending of the wall so that the expanded tubular section retains an expanded shape as a result of the plastic deformation.

14. The method of claim 1, wherein the downward force is an axially compressive force inducing the downward movement of the remaining tubular section.

15. The method of claim 14, wherein the axially compressive force at least partly results from the weight of the remaining tubular section.

16. A method of creating a wellbore system, the method comprising:

a) arranging an expandable tubular element in a wellbore formed in an earth formation whereby a lower end portion of a wall of the tubular element extends radially outward and in an axially reverse direction so as to form an expanded tubular section extending around a remaining tubular section of the expandable tubular element;
b) axially extending the expanded tubular section by moving the remaining tubular section downward relative to the expanded tubular section so that the lower end portion of the wall bends radially outward and in an axially reverse direction, whereby an annulus is defined between the expanded and remaining tubular sections, the annulus containing a fluid;
c) operating a drill string to further drill the wellbore while moving the remaining tubular section downward relative to the expanded tubular section, the drill string extending through the remaining tubular section; and
d) replacing a volume of the fluid by pumping a stream of a replacement fluid into the annulus and discharging the volume of the fluid from the annulus whereby at least one of the volume of the fluid and the stream of the replacement fluid flows through a conduit extending into the annulus.

17. The method of claim 16, wherein the replacement fluid and the fluid have mutually different densities, and wherein the method further comprises arranging sealing means in the annulus so as to seal the replacement fluid from the fluid.

18. A method of creating a wellbore system, the method comprising:
a) arranging an expandable tubular element in a wellbore formed in an earth formation whereby a lower end portion of a wall of the tubular element extends radially outward and in an axially reverse direction so as to form an expanded tubular section extending around a remaining tubular section of the expandable tubular element, wherein the wall of the tubular element is comprised of a ductile metal capable of being plastically deformed by eversion of the tubular element;
b) axially extending the expanded tubular section by moving the remaining tubular section downward relative to the expanded tubular section so that the lower end portion of the wall bends radially outward and in an axially reverse direction, whereby an annulus is defined between the expanded and remaining tubular sections, the annulus containing a fluid; and
c) replacing a volume of the fluid by pumping a stream of a replacement fluid into the annulus and discharging the volume of the fluid from the annulus whereby at least one of the volume of the fluid and the stream of the replacement fluid flows through a conduit extending into the annulus.

19. The method of claim 18, wherein the expanded tubular section has a collapse resistance of at least 100 bars.

* * * * *